United States Patent
Xiong et al.

(10) Patent No.: US 10,564,631 B2
(45) Date of Patent: Feb. 18, 2020

(54) SERVO MOVEMENT CONTROL METHOD, DEVICE, AND TERMINAL DEVICE

(71) Applicant: UBTECH Robotics Corp, Shenzhen (CN)

(72) Inventors: Youjun Xiong, Shenzhen (CN); Lifu Zhang, Shenzhen (CN); Mingzhao Li, Shenzhen (CN); Zhenmin Mo, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 16/140,546

(22) Filed: Sep. 25, 2018

(65) Prior Publication Data

US 2019/0121328 A1    Apr. 25, 2019

(30) Foreign Application Priority Data

Oct. 23, 2017   (CN) .......................... 2017 1 0992569

(51) Int. Cl.
G05B 19/25    (2006.01)
G05B 19/416   (2006.01)
G05B 19/19    (2006.01)
G05B 21/02    (2006.01)

(52) U.S. Cl.
CPC ......... *G05B 19/4163* (2013.01); *G05B 19/19* (2013.01); *G05B 21/02* (2013.01); *G05B 2219/42128* (2013.01); *G05B 2219/42173* (2013.01); *G05B 2219/43006* (2013.01)

(58) Field of Classification Search
CPC .............................. G05B 19/19; G05B 21/02
See application file for complete search history.

(56) References Cited

U.S. PATENT DOCUMENTS

2018/0302969 A1* 10/2018 Chen .................. H05B 33/0848

* cited by examiner

*Primary Examiner* — Karen Masih (57) ABSTRACT

A servo movement control method, device, and terminal device are provided. The method includes: controlling an output shaft of the servo to rotate according to a first motion instruction; detecting whether a second motion instruction is received within a first preset time period, and re-planning a second target motion curve to a second target end position from a corresponding target position on a first target motion curve when receiving the second motion instruction; and controlling the output shaft to rotate from an actual position when receiving the second motion instruction to the second target end position according to the second target motion curve. When the second motion instruction is received, the servo is controlled to rotate from the target position to the second target end position according to the second motion instruction, so that the servo is switched from the first motion instruction to the second motion instruction smoothly.

15 Claims, 5 Drawing Sheets

---

S101
Control an output shaft of the servo to rotate according to a first motion instruction, where the first motion instruction is configured to control the output shaft of the servo to rotate from an actual position when receiving the first motion instruction to a first target end position according to a first target motion curve S102
Detect whether a second motion instruction is received within a first preset time period, and re-plan a second target motion curve to a second target end position from an corresponding target position on the first target motion curve when receiving the second motion instruction S103
Control the output shaft of the servo to rotate from an actual position when receiving the second motion instruction to the second target end position according to the second target motion curve

FIG. 1

(Prior Art)

S101 — Control an output shaft of the servo to rotate according to a first motion instruction, where the first motion instruction is configured to control the output shaft of the servo to rotate from an actual position when receiving the first motion instruction to a first target end position according to a first target motion curve

S102 — Detect whether a second motion instruction is received within a first preset time period, and re-plan a second target motion curve to a second target end position from an corresponding target position on the first target motion curve when receiving the second motion instruction

S103 — Control the output shaft of the servo to rotate from an actual position when receiving the second motion instruction to the second target end position according to the second target motion curve

SERVO MOVEMENT CONTROL METHOD, DEVICE, AND TERMINAL DEVICE

CROSS REFERENCE TO RELATED APPLICATIONS

This application claims priority to Chinese Patent Application No. 201710992569.4, filed Oct. 23, 2017, which is hereby incorporated by reference herein as if set forth in its entirety.

BACKGROUND

1. Technical Field

The present disclosure relates to motion control technology, and particularly to a method, a device, and a terminal device for servo movement control.

2. Description of Related Art

Figure 1:
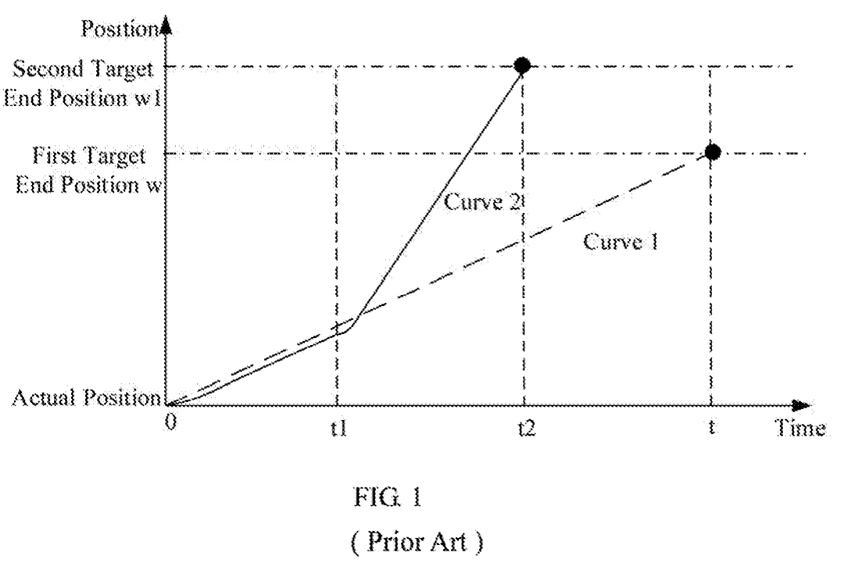
FIG. 1 is a schematic block diagram of motion curves of a conventional servo when switching motion instructions.

A servo is an angle actuator, which is suitable for a control system that requires the angle to keep changing and can be maintained, and has been widely used in high-end remote control toys and remote control robots. The servo will respond accordingly in response to a motion instruction. During the process of actual motion, there will be a case that a new motion instruction is received before the previous motion instruction has been responded. In this case, the servo will usually be switched to the new motion instruction immediately for responding. However, when switching from the previous motion instruction to the new motion instruction, the new motion instruction and the previous motion instruction will not be switched smoothly. In a specific application, the servo has an acceleration process from 0 to an target speed after receiving a first motion instruction. FIG. 1 is a schematic block diagram of motion curves of a conventional servo when switching motion instructions. As shown in FIG. 1, the servo is controlled to move according to the first motion instruction when the servo receives the first motion instruction, where a first target end position is w, a first preset time period is 0–t. The servo receives the second motion instruction at time t1, where a second target end position is w1, a second time period is t1-t2. Due to the mechanical structure and control algorithm, the servo will be moved from the actual position to the second target end position when the servo receives the second motion instruction. In an actual motion, a "motion-stop-motion" process which the movement speed decelerates from the first target speed to 0 and then accelerates from 0 to the second target speed will occur, which causes the servo to fail to switch the motion instructions smoothly.

In summary, the servo movement control method in the prior art has a problem that the motion instructions cannot be switched smoothly.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

The present disclosure provides a method, a device, and a terminal device for servo movement control. When the second motion instruction is received, the servo is controlled to move from the target position when receiving the second motion instruction to the second target end position according to the second motion instruction, so that the servo is switched from the first motion instruction to the second motion instruction smoothly while the implementation is simple, which effectively resolve the problem of the existing servo movement control method that the motion instructions cannot be switched smoothly.

In order to explain the technical solutions described in the present disclosure, the following provides a description through specific embodiments.

Embodiment 1

Figure 2:
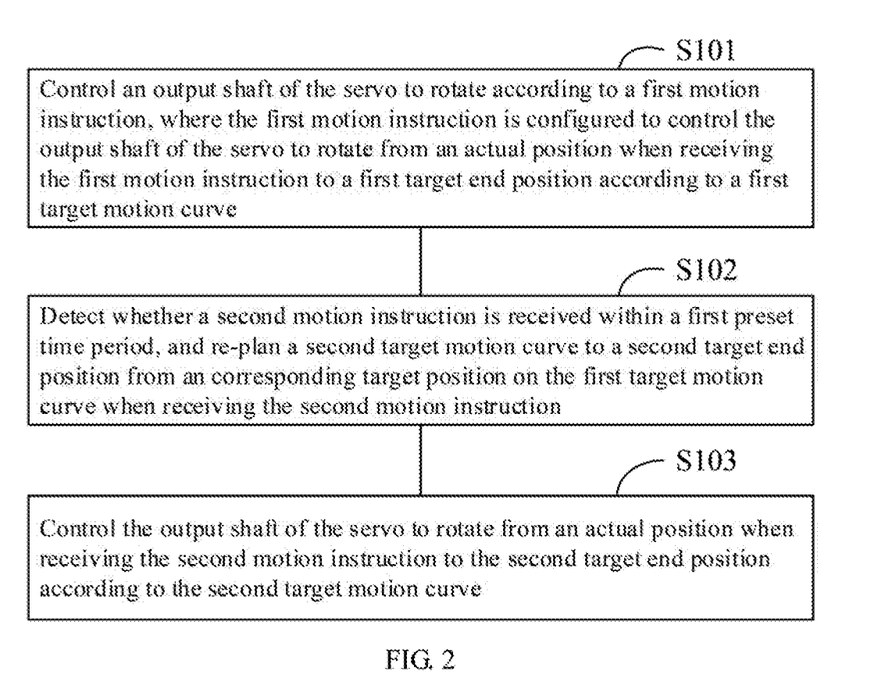
FIG. 2 is a flow chart of a servo movement control method according to the first embodiment of the present disclosure.

FIG. 2 is a flow chart of a servo movement control method according to the first embodiment of the present disclosure. In this embodiment, the method is a computer-implemented method executable for a processor, and can be implemented through, for example, a servo movement control device (see FIG. 4) including the processor. The servo movement control method of this embodiment can be applied to a servo of a robot, where the servo is electronically connected to the processor (servo movement control device) in a direct or indirect manner. The movement of the servo specifically means the rotation of an output shaft of the servo. The servo may be used as a joint of the robot, so as to realize the movement of a limb of the robot which connected to the joint. As shown in FIG. 2, the method includes the following steps.

S101: controlling an output shaft of the servo to rotate according to a first motion instruction, where the first motion instruction is configured to control the output shaft of the servo to rotate from an actual position when receiving the first motion instruction to a first target end position according to a first target motion curve.

In an embodiment, when receiving the first motion instruction, the output shaft of the servo will be controlled to move (i.e., rotate) to the first target end position from the actual position at which the first motion instruction is received (i.e., the position where the output shaft of the servo is located in the meantime of receiving the first motion instruction), according to the first motion instruction, where the period of the output shaft of the servo to rotate from the actual position at which the first motion instruction is received to the first target end position is the first preset time period. The output shaft of the servo will be controlled In an embodiment, the first motion instruction is specifically configured to control the output shaft of the servo to rotate from the actual position at which the first motion instruction is received to the first target end position, in which the movement (i.e., rotation) time thereof is the first preset time period.

S102: detecting whether a second motion instruction is received within a first preset time period, and re-planning a second target motion curve to a second target end position from a corresponding target position on the first target motion curve when receiving the second motion instruction.

In an embodiment, if it is detected that the second motion instruction is received within the first preset time period, it indicates that the second motion instruction has been received by the servo before the first motion instruction has been responded, and the servo needs to be switched to respond to the second motion instruction.

In an embodiment, the second motion instruction is specifically configured to control the output shaft of the servo to move (i.e., rotate) from the first target end position to the second target end position, in which the movement (i.e., rotation) time thereof is the second preset time period, and the starting time of the second preset time period is within the first preset time period.

S103: controlling the output shaft of the servo to rotate from an actual position when receiving the second motion instruction to the second target end position according to the second target motion curve.

In an embodiment, if the second motion instruction is received within the first preset time period, the output shaft of the servo will be controlled to move (i.e., rotate) to the second target end position from the target position when the second motion instruction is received (i.e., the target position for the output shaft of the servo to locate in the meantime of receiving the second motion instruction), according to the second motion instruction, where the period of the output shaft of the servo to rotate from the target position when the second motion instruction is received to the second target end position is the second preset time period. The starting time of the second preset time period is within the first preset time period.

In an embodiment, before step S103, the method further includes the following step.

S104: generating the first target motion curve based on the actual position when receiving the first motion instruction, the first target end position, and the first preset time period.

In an embodiment, when receiving the first motion instruction, the servo is capable of generating the target motion curve corresponding to the first motion instruction, and an target position corresponding to each time point of the target motion curve can be obtained by the target motion curve.

In an embodiment, before step S104, the method further includes the following step.

S105: obtaining the target position based on the first target motion curve.

Figure 3:
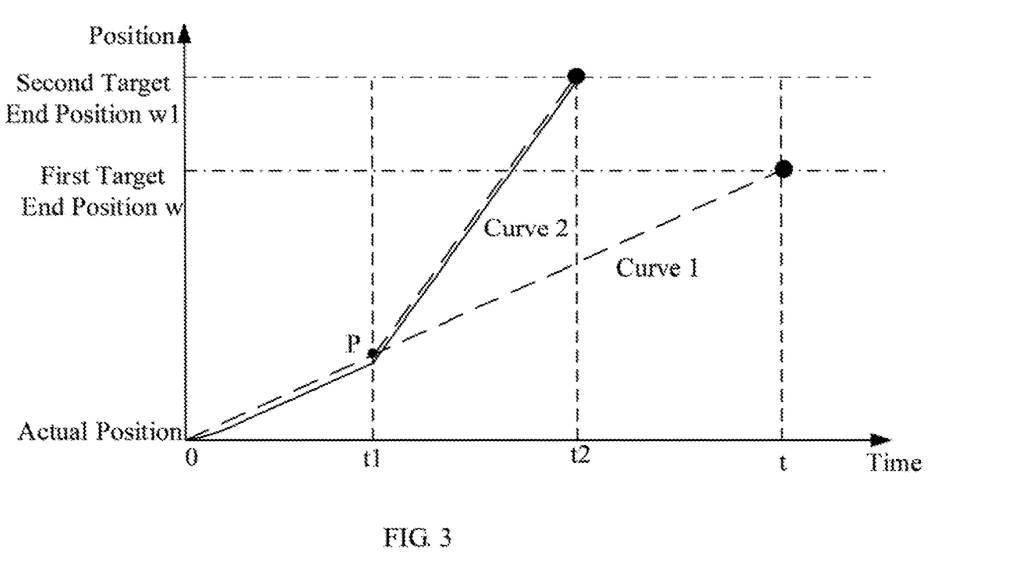
FIG. 3 is a schematic block diagram of motion curves of a conventional servo when switching motion instructions of the servo movement control method according to the first embodiment of the present disclosure.

In an embodiment, each time point of the movement of the output shaft of the servo in the target motion curve of the output shaft of the servo has a linear relationship with the target position of the output shaft of the servo. FIG. 3 is a schematic block diagram of motion curves of a conventional servo when switching motion instructions of the servo movement control method according to the first embodiment of the present disclosure. In which, the dotted line (i.e., curve 1) is the target motion curve, and the solid line (i.e., curve 2) is the actual motion curve. As shown in FIG. 3, when receiving the first motion instruction, the output shaft of the servo is controlled to rotate according to the first motion instruction, where the first target end position is w, the first preset time period is 0–t, and the servo receives the second motion instruction at time t1, where the second target end position is w1. In the second preset time period t1-t2, when the servo receives the second motion instruction within the first preset time period 0–t, the time of receiving the second motion instruction is time t1, and the target position of the output shaft of the servo is the position of point P of curve 1. The output shaft of servo is controlled to move from the target position of point P to the second target end position w1 upon receiving the second motion instruction. In which, curve 2 is the actual motion curve of the output shaft of the servo. When receiving the second motion instruction, the output shaft of the servo is directly rotated from the target position of the point P to the second target end position w1 according to the second motion instruction, so that the servo is switched from the first motion instruction to the second motion instruction smoothly.

In an embodiment, the above-mentioned method further includes:

Step S106: controlling the output shaft of the servo to rotate according to the third motion instruction, if a third motion instruction is received without the first preset time period, where the third motion instruction is configured to control the output shaft of the servo to rotate from the actual position when the third motion instruction is received to a third target end position.

If the third motion instruction is received without the first preset time period, it indicates that the response to the first motion instruction has been completed. At this time, there is no necessary to stop responding to the first motion instruction, and it is switched to respond to the third motion instruction to move according to the third motion instruction. That is, the output shaft of the servo is controlled to rotate from the actual position when receiving the third motion instruction to the third target end position.

In the servo movement control method provided by this embodiment, when the second motion instruction is received, the output shaft of the servo is controlled to rotate from the target position when receiving the second motion instruction to the second target end position according to the second motion instruction, so that the servo is switched from the first motion instruction to the second motion instruction smoothly while the implementation is simple, which effectively resolve the problem of the existing servo movement control method that the motion instructions cannot be switched smoothly.

Embodiment 2

Figure 4:
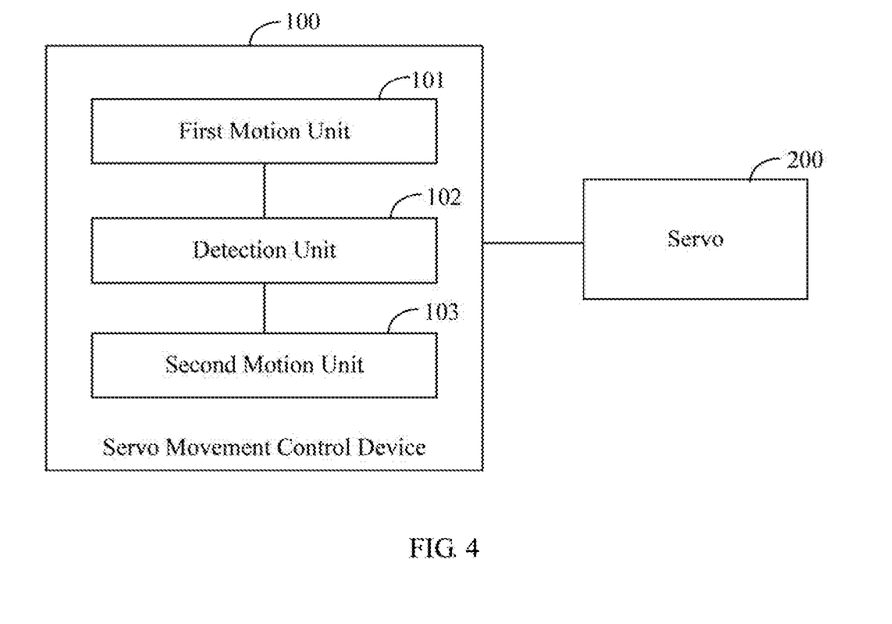
FIG. 4 is a schematic block diagram of a servo movement control device according to the second embodiment of the present disclosure.

FIG. 4 is a schematic block diagram of a servo movement control device according to the second embodiment of the present disclosure. A servo movement control device 100 is provided, which is configured to perform the steps in the embodiment corresponding to FIG. 2 so as to control a servo 200 of a robot. In this embodiment, the servo movement control device 100 is electronically connected to the servo 200 in a direct or indirect manner. The movement of the servo 200 specifically means the rotation of an output shaft of the servo 200. The servo 200 may be used as a joint of the robot, so as to realize the movement of a limb of the robot which connected to the joint. As shown in FIG. 4, the servo movement control device 100 includes:

a first motion unit 101 configured to control an output shaft of the servo to rotate according to a first motion instruction, where the first motion instruction is configured to control the output shaft of the servo to rotate from an actual position when receiving the first motion instruction to a first target end position according to a first target motion curve;

a detection unit 102 configured to detect whether a second motion instruction is received within a first preset time period, and re-plan a second target motion curve to a second target end position from a corresponding target position on the first target motion curve when receiving the second motion instruction; and a second motion unit 103 configured to control the output shaft of the servo to rotate from an actual position when receiving the second motion instruction to the second target end position according to the second target motion curve.

In one embodiment, the servo movement control device 100 further includes:

an target position obtaining unit configured to obtain the target position based on the first target motion curve.

In one embodiment, the servo movement control device 100 further includes:

a curve generating unit configured to generate the first target motion curve based on the actual position when receiving the first motion instruction, the first target end position, and the first preset time period.

It should be noted that, the servo movement control device provided by this embodiment is based on the same concept as the method embodiment shown in FIG. 2 of the present disclosure, and the technical effects thereof are the same as the method embodiment shown in FIG. 2. For details, refer to the description in the method embodiment shown in FIG. 2, which are not described herein.

Embodiment 3

Figure 5:
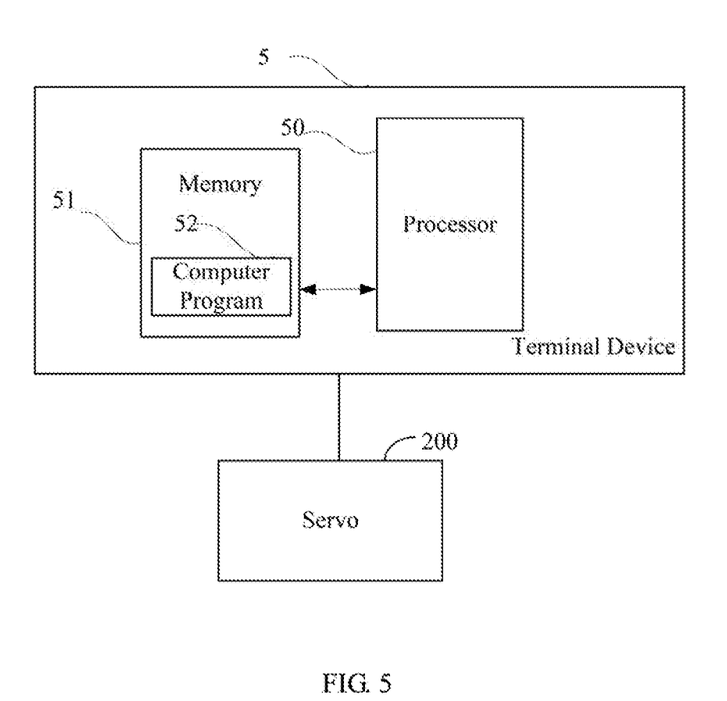
FIG. 5 is a schematic block diagram of a terminal device according to the third embodiment of the present disclosure.

FIG. 5 is a schematic block diagram of a terminal device according to the third embodiment of the present disclosure. The terminal device of this embodiment is configured to control a servo 200 of a robot. In this embodiment, the terminal device is electronically connected to the servo 200 in a direct or indirect manner. The movement of the servo 200 specifically means the rotation of an output shaft of the servo 200. The servo 200 may be used as a joint of the robot, so as to realize the movement of a limb of the robot which connected to the joint. As shown in FIG. 5, the terminal device 5 of this embodiment includes a processor 50, a memory 51, and a computer program 52 stored in the memory 51 and executable on the processor 50. When executing (instructions in) the computer program 52, the processor 50 implements the steps in the above-mentioned embodiments of the servo movement control, for example, steps 101-103 shown in FIG. 1. Alternatively, when the processor 50 executes (instructions in) the computer program 52, the functions of each module/unit in the above-mentioned embodiments of the servo movement control device, for example, the functions of the modules 101-103 shown in FIG. 4 are implemented.

Exemplarily, the computer program 52 may be divided into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the terminal device 5. For example, computer program 52 can be divided into a first motion unit, a detection unit, and a second motion unit. The specific functions of each unit are as follows.

The first motion unit is configured to control the output shaft of the servo to rotate according to a first motion instruction, wherein the first motion instruction is configured to control the output shaft of the servo to rotate from an actual position when receiving the first motion instruction to a first target end position.

The detection unit is configured to detect whether a second motion instruction is received within a first preset time period, wherein the second motion instruction is configured to control the output shaft of the servo to rotate from an target position when receiving the second motion instruction to a second target end position.

The second motion unit is configured to control the output shaft of the servo to rotate according to the second motion instruction, in response to receiving the second motion instruction within the first preset time period.

The terminal device 5 may be a computing device such as a desktop computer, a notebook computer, a tablet computer, and a cloud server. The terminal device 5 may include, but is not limited to, a processor 50 and a storage 51. It can be understood by those skilled in the art that FIG. 5 is merely an example of the terminal device 5 and does not constitute a limitation on the terminal device 5, and may include more or fewer components than those shown in the figure, or a combination of some components or different components. For example, the terminal device 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the terminal device 5, for example, a hard disk or a memory of the terminal device 5. The storage 51 may also be an external storage device of the terminal device 5, for example, a plug-in hard disk, a smart media card (SMC), a secure digital (SD) card, flash card, and the like, which is equipped on the terminal device 5. Furthermore, the storage 51 may further include both an internal storage unit and an external storage device, of the terminal device 5. The storage 51 is configured to store the computer program and other programs and data required by the terminal device 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented servo movement control method for a servo of a robot, comprising executing on a processor steps of:
   controlling an output shaft of the servo to rotate according to a first motion instruction, wherein the first motion instruction is configured to control the output shaft of the servo to rotate from an actual position when receiving the first motion instruction to a first target end position according to a first target motion curve;
   detecting whether a second motion instruction is received within a first preset time period, and re-planning a second target motion curve to a second target end position from a corresponding target position on the first target motion curve when receiving the second motion instruction; and
   controlling the output shaft of the servo to rotate from an actual position when receiving the second motion instruction to the second target end position according to the second target motion curve.

2. The method of claim 1, wherein before the step of re-planning the second target motion curve comprises:
   obtaining the gage position based on the first target motion curve.

3. The method of claim 2, wherein before the step of obtaining the target position based on the first target motion curve comprises:
   generating the first target motion curve based on the actual position when receiving the first motion instruction, the first target end position, and the first preset time period.

4. The method of claim 1, wherein the first motion instruction is configured to control the output shaft of the servo to rotate from the actual position when receiving the first motion instruction to the first target end position while the movement time is the first preset time period.

5. The method of claim 1, wherein the second motion instruction is configured to control the output shaft of the servo to rotate from the first target end position to the second target end position while the movement time is the second preset time period, and the starting time of the second preset time period is within the first preset time period.

6. A servo movement control device for a servo of a robot, comprising:
- a first motion unit configured to control an output shaft of the servo to rotate according to a first motion instruction, wherein the first motion instruction is configured to control the output shaft of the servo to rotate from an actual position when receiving the first motion instruction to a first end position according to a first target motion curve;
- a detection unit configured to detect whether a second motion instruction is received within a first preset time period, and re-plan a second target motion curve to a second target end position from a corresponding target position on the first target motion curve when receiving the second motion instruction in response to receiving the second motion instruction; and
- a second motion unit configured to control the output shaft of the servo to rotate from an actual position when receiving the second motion instruction to the second target end position according to the second target motion curve.

7. The device of claim 6, further comprising:
an target position obtaining unit configured to obtain the target position based on the first target motion curve.

8. The device of claim 7, further comprising:
a curve generating unit configured to generate the first target motion curve based on the actual position when receiving the first motion instruction, the first target end position, and the first preset time period.

9. The device of claim 6, wherein the first motion instruction is configured to control the output shaft of the servo to rotate from the actual position when receiving the first motion instruction to the first target end position while the movement time is the first preset time period.

10. The device of claim 6, wherein the second motion instruction is configured to control the output shaft of the servo to rotate from the first target end position to the second target end position while the movement time is the second preset time period, and the starting time of the second preset time period is within the first preset time period.

11. A terminal device for a servo of a robot, comprising a non-transitory memory, one or more processors, and one or more computer programs, wherein the one or more computer programs are stored in the non-transitory memory and configured to be executed by the one or more processors, the one or more programs comprise:
- instructions for controlling an output shaft of the servo to rotate according to a first motion instruction, wherein the first motion instruction is configured to control the output shaft of the servo to rotate from an actual position when receiving the first motion instruction to a first target end position according to a first target motion curve;
- instructions for detecting whether a second motion instruction is received within a first preset time period, and re-planning a second target motion curve to a second target end position from a corresponding target position on the first target motion curve when receiving the second motion instruction in response to receiving the second motion instruction; and
- instructions for controlling the output shaft of the servo to rotate from an actual position when receiving the second motion instruction to the second target end position according to the second target motion curve.

12. The terminal device of claim 11, the one or more programs further comprise:
instructions for obtaining the target position based on the first target motion curve.

13. The terminal device of claim 12, the one or more programs further comprise:
instructions for generating the first target motion curve based on the actual position when receiving the first motion instruction, the first bar end position, and the first preset time period.

14. The terminal device of claim 11, wherein the first motion instruction is configured to control the output shaft of the servo to rotate from the actual position when receiving the first motion instruction to the first target end position while the movement time is the first preset time period.

15. The terminal device of claim 11, wherein the second motion instruction is configured to control the output shaft of the servo to rotate from the first target end position to the second target end position while the movement time is the second preset time period, and the starting time of the second preset time period is within the first preset time period.

* * * * *